June 22, 1965  G. A. REED  3,190,171
VIEWING DEVICE HAVING OPTICAL ARRANGEMENT
PRODUCING VIRTUAL IMAGE AT INFINITY
Filed June 7, 1960  3 Sheets-Sheet 1

INVENTOR.
George A. Reed
BY
Popp and Sommer
ATTORNEYS.

INVENTOR.
George A Reed
BY
Popp and Sommer
ATTORNEYS.

June 22, 1965 G. A. REED 3,190,171
VIEWING DEVICE HAVING OPTICAL ARRANGEMENT
PRODUCING VIRTUAL IMAGE AT INFINITY
Filed June 7, 1960 3 Sheets-Sheet 3

INVENTOR.
George A. Reed
BY
Popp and Sommer
ATTORNEYS.

United States Patent Office
3,190,171
Patented June 22, 1965

3,190,171
VIEWING DEVICE HAVING OPTICAL ARRANGE-
MENT PRODUCING VIRTUAL IMAGE AT
INFINITY
George A. Reed, Williamsville, N.Y., assignor to The
Oxford Corporation, Williamsville, N.Y., a corporation
of New York
Filed June 7, 1960, Ser. No. 34,507
9 Claims. (Cl. 88—1)

This invention relates to a viewing device, and more particularly to the application of the viewing device as a carrier landing simulator which is specifically adapted to training pilots while they are operationally deployed on an aircraft carrier.

The reduction of the landing accident rate during carrier air operations may be approached from several directions. One of these is the provision of visual aids which serve to indicate to the pilot whether or not he is on the proper glide path, such as a mirror landing system. Another approach is through the provision of deck lighting which makes the problem of night landing much less hazardous. A third approach, which is complementary to the others, is the provision of training devices which will be useful in increasing pilot proficiency in the landing maneuver. It is to this last mentioned approach that the present invention relates.

A general and important object of the present invention is to provide a compact viewing device in which the image of the object viewed by the observer appears more distant than the object is actually away from the observer.

Another object is to provide such a viewing device in which the field of view is large.

Another object is to provide such a viewing device in which the impression of relative movement between the observer and the object viewed may be created, even to the extent of the object appearing to pass the observer.

Regarding the preferred embodiment of the present invention in a carrier landing simulator, the primary object is to provide a viewing device in which extra-cockpit information is properly presented in the form of a highly realistic view of the carrier, sea and sky.

In line with this main purpose, a secondary object is to provide an optical arrangement which provides a field of view to the pilot that is about 30° high and 180° wide so as to approximate closely that which is available to the pilot in an actual aircraft.

A further object is to provide a carrier landing simulator, including the viewing device and the control system therefor, which is of a size and nature that it may be placed aboard ship so that personnel will have access to the trainer when they need it most.

Another object of the present invention is to provide such a simulator in which the pilot has complete freedom of choice in maneuvering the aircraft during the landing run.

Other objects and advantages of the present invention will be apparent from the following detailed description of a preferred and illustrative embodiment thereof and the accompanying drawings wherein.

Figure 4:
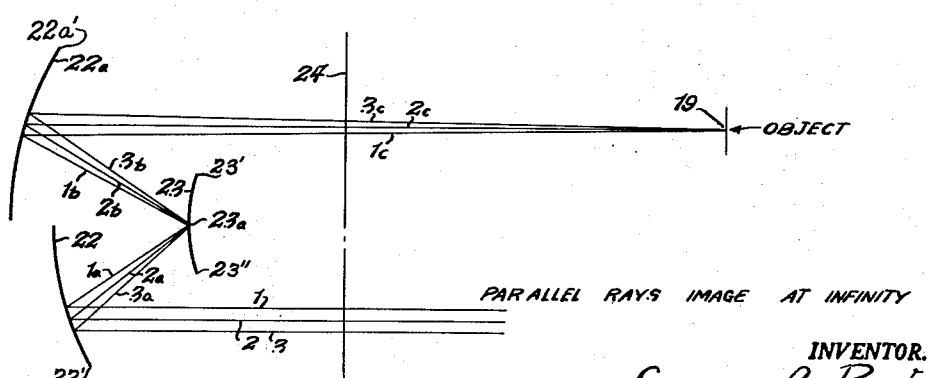

FIG. 4 is a similar diagrammatic view but illustrating the preferred mode of adjusting or focusing the image of the object being viewed which is within a limited number of focal lengths away from the optical arrangement so that the light rays may be considered to diverge therefrom and the image is reflected as parallel rays to be viewed by the observer thereby to create the impression that the image is at infinity.

Figure 5:
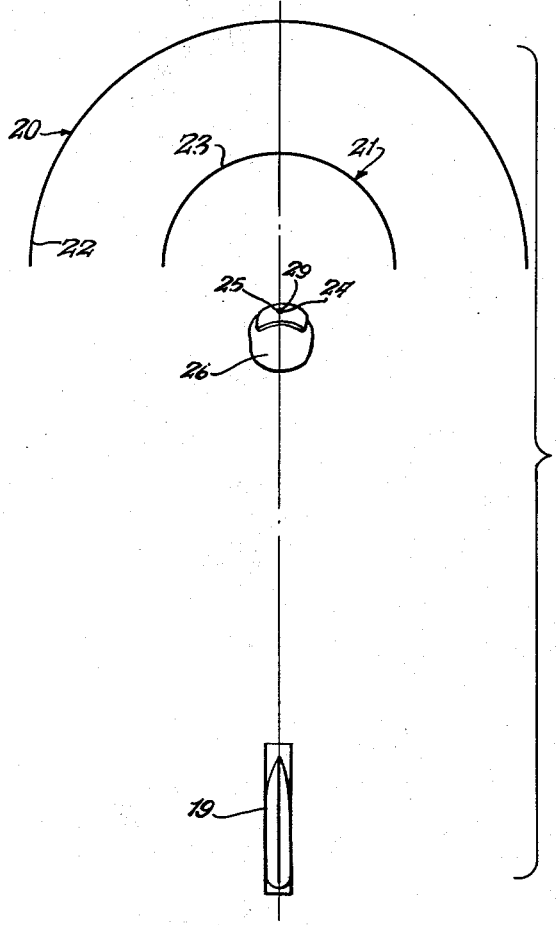

FIG. 5 is a diagrammatic representation in a horizontal central sectional plane of the aforesaid optical arrangement and showing the relation thereof to the head of the viewing pilot and the carrier model.

Figure 6:
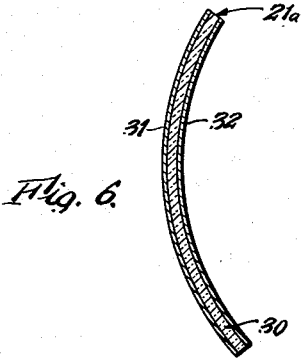

FIG. 6 is an enlarged fragmentary sectional view of a transparent reflector constructed in accordance with the principles of the present invention so as to have a specular surface on its convex side and a picture or scape on its concave side.

Figure 7:
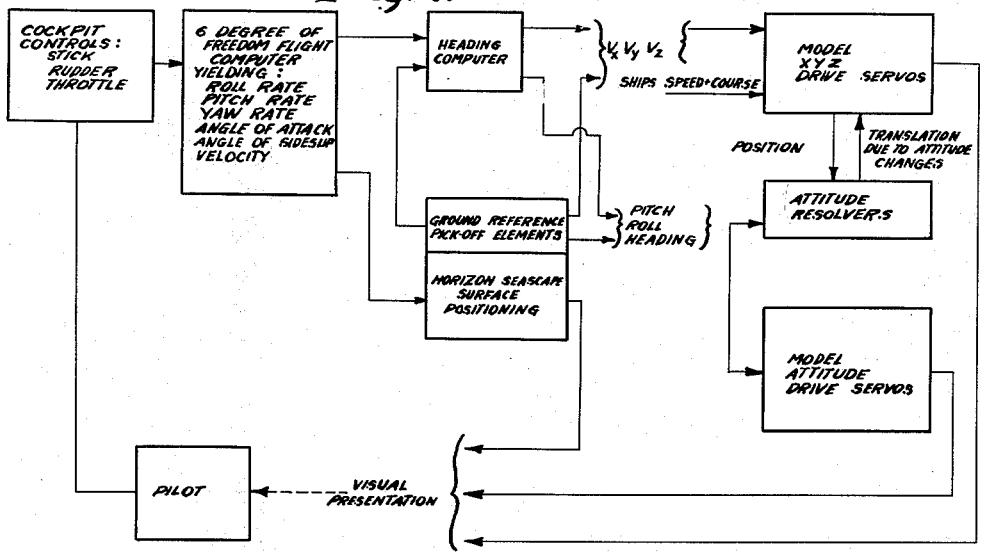

FIG. 7 is a block diagram of the control system for the simulator.

Figure 1:
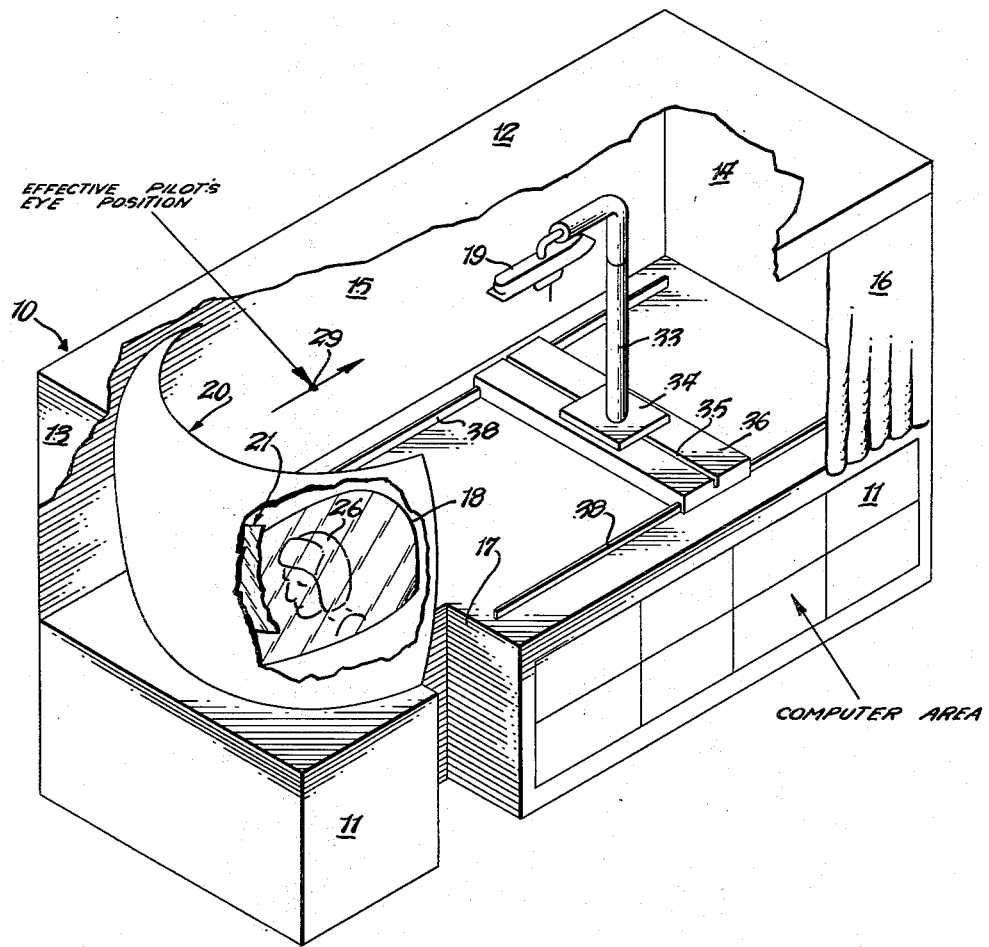
FIG. 1 is a perspective view, somewhat diagrammatic, of a flight simulator for carrier landing training embodying the present invention, and illustrating the simulator with portions broken away so as to reveal hidden structure.

Referring to FIG. 1, the simulator is shown as comprising an enclosure 10 including a base 11, a top wall 12, end walls 13 and 14, and side walls 15 and 16. The side wall 16 may be a draw curtain as shown to permit a trainee to enter and leave a viewing station within the enclosure through a passage or aisle 17 in the base 11. The viewing station is a simulated cockpit having a windshield 18. The trainee sits in the cockpit, looks out through the windshield 18 and through an optical system at a scale model of the carrier shown at 19.

Figure 2:
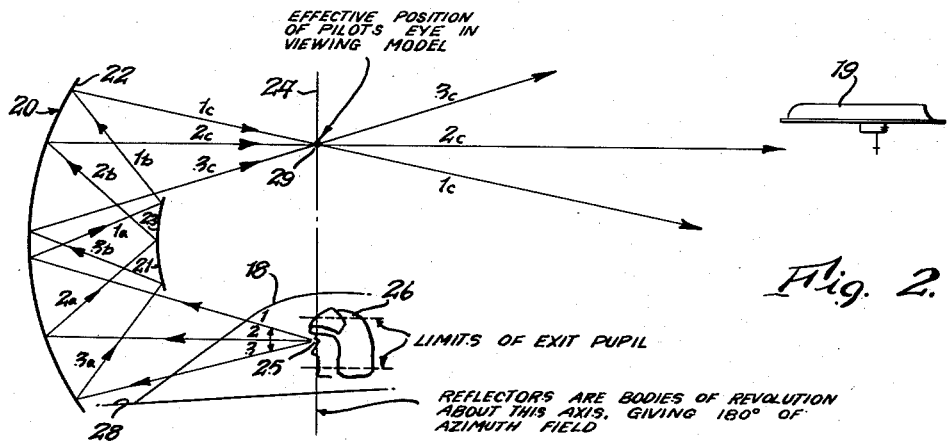
FIG. 2 is a diagrammatic representation in a vertical central sectional plane of the optical arrangement forming part of the simulator shown in FIG. 1 and showing the relationship of the pilot's eye to the object viewed which in this case is a model of an aircraft carrier.

The optical arrangement includes a first reflector 20 and a second reflector 21. The reflector 20 has a concave specular surface 22 which faces toward the trainee. The other reflector 21 has a convex specular surface 23 which faces toward the concave specular surface 22. The opposing specular surfaces 22 and 23 are spaced from each other and are generated by revolution about a common vertical axis 24 through approximately 180° to provide a wide azimuth field, as shown in FIG. 5. Not only are the specular surfaces 22 and 23 respectively concave and convex in a horizontal plane as shown in FIG. 5, but they are also similarly concave and convex, respectively, in a vertical plane as shown in FIG. 2. While the specular surfaces 22 and 23 are preferably spherical in configuration or substantially so and concentric, these surfaces may be formed as other suitable surfaces of revolution.

The reflectors 20 and 21 are shown as having straight, horizontal, upper and lower edges. For the reflector 20, its upper edge is designated 20' and its lower edge 20''; and for the reflector 21, its upper edge is designated 21' and its lower edge 21''. While these reflectors have the same azimuth, i.e. 180°, the inner reflector 21 is smaller in a vertical direction than the outer reflector 20 so that a considerable portion of reflector 20 extends above and below reflector 21. Stated otherwise, the chordal length of the convex specular surface 23 between edges 21' and 21'' is shorter than that between edges 20' and 20'' of the concave specular surface 22 measured in a vertical direction and plane.

The viewing station 25 or exit pupil may be considered as the eye of the observer whose head 26 is represented in FIGS. 2 and 5. Referring to these figures, it will be seen that the viewing station 25 is located on the vertical axis 24 as is preferred. This viewing station is determined by positioning the trainee the necessary distance away from the concave specular surface 22 which he faces. The upwardly inclined maximum line of sight from the viewing station 25 to the concave specular surface 22 is limited by the lower edge of the convex specular surface 23. This line of sight is numbered 1 in FIG. 2. The downwardly inclined maximum line of sight numbered 3 in FIG. 2 extends from viewing station 25 to the concave specular surface 22 and is limited as a practical matter by a simulated cowl 28 from which the windshield 18 rises. The angle between these lines of sight 1 and 3 is preferably about 30° measured in a vertical plane so that in combination with 180° azimuth, a large field of view is provided, much the same as that which is available to a pilot in a real aircraft.

Reverting again to FIG. 2, an intermediate line of sight number 2 is shown as emanating from viewing station 25 toward concave specular surface 22. It will be seen that the lines of sight 1, 2 and 3 are reflected from the concave specular surface 22 as lines 1a, 2a and 3a, respectively, for impingement against and reflection from the convex specular surface 23 as lines 1b, 2b and 3b, respectively. These lines are again reflected by the concave specular surface 22 as lines 1c, 2c and 3c and intersect at point 29 which is located on vertical axis 24. The upper horizontal edge of the convex specular surface 23 is arranged below that for the concave specular surface 22 so that the reflected line of sight 3c just clears this edge. It will be noted that the reflected lines of sight 1c, 2c and 3c extend rearwardly of the trainee past the point of intersection 29 or entrance pupil. In rear of the vertical axis 24, it will be noted that the lines of sight 1c, 2c, 3c are inverted as compared to the correspondingly numbered lines of sight 1, 2 and 3 adjacent the viewing station 25. Because of this, the object to be viewed, in this case a scale model of a carrier 19, is inverted. Since the specular surfaces 22 and 23 are surfaces of revolution about the vertical axis 24, the ray trace shown in FIG. 2 is valid for all azimuth angles through 180°.

From the foregoing optical arrangement, it will be seen that the object to be viewed is arranged vertically above or laterally of one side of the reflector 21, and the viewing station 25 is arranged vertically below or laterally of the other side of this reflector 21.

Considered in another manner, it will be seen that the the eye of the observer located at 25 is imaged upside down in the upper focus of the system at point 29, this point and the viewing station being vertically spaced apart along the same vertical line. The effect is to present to the trainee a view which is the same as he would see if he were to be located in an inverted position above his own head looking aft toward the carrier model 19.

Figure 3:
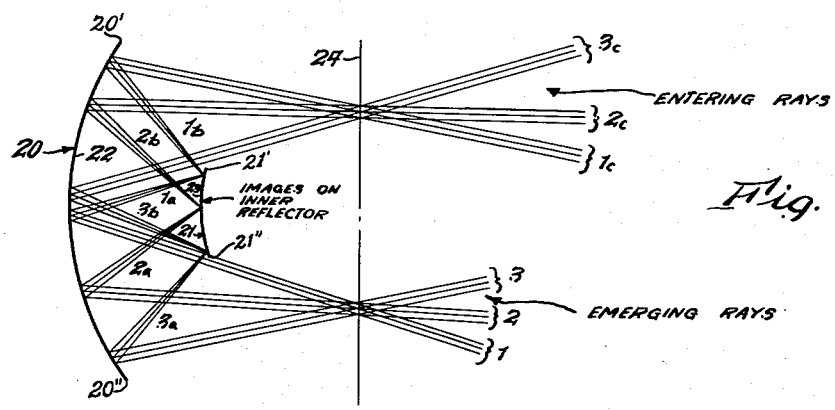
FIG. 3 is a view somewhat similar to FIG. 2 but showing solely the aforesaid optical arrangement and its relation to entering and emerging parallel light rays.

If the entering light rays which emanate from a luminous object being viewed, are considered parallel, as if the object were located at infinity, these entering rays will travel along reflected courses depicted in FIG. 3. For comparison with FIG. 2, each group of entering rays, there being three rays represented in each group, is designated by the same respective reference, namely 1c, 2c and 3c. The spacing of the specular surfaces 22 and 23 is such that the rays reflected from the concave specular surface 22 and designated 1b, 2b and 3b are focused or converge or intersect on the convex specular surface 23. From this surface they are again reflected in divergent manner as lines 1a, 2a and 3a toward concave specular surface 22 from which they are again reflected as parallel emerging rays 1, 2 and 3. It will be noted that the emerging rays 1, 2, 3 are inverted or upside down as compared with the corresponding entering rays 1c, 2c and 3c.

Since the entering rays 1c, 2c and 3c are parallel and are focused on the convex specular surface 23, this surface is spaced from the concave specular surface 22 a distance equal to the prime focal length of such concave surface 22, and therefore the emerging rays are parallel and form a virtual image at infinity. This gives the observer the impression that the object he is viewing is located behind the concave surface 22 at a great distance.

Inasmuch as within the limited space desired to be devoted to such a training device, the entering rays emanating from the object being viewed will not be parallel as represented in FIG. 3, but the object will be located within several focal lengths, say under ten focal lengths, the entering rays 1c, 2c and 3c will diverge forwardly away from the object as represented in FIG. 4. These rays impinge upon a concave specular surface 22a which is an upper portion of the concave specular surface 22. The surface 22a is preferably movable relative to the convex specular surface 23 which is fixed so that the relative spacing between these two surfaces can be adjusted. Adjustment is required in order to focus the reflections of 1b, 2b and 3b of the entering rays upon the convex specular surface 23 as represented at the point 23a. The image focused at 23a is reflected as rays 1a, 2a and 3a and these in turn are reflected from concave specular surface 22 as parallel rays 1, 2 and 3. The effect of these emerging rays 1, 2 and 3 being parallel is to create the impression to the eye of the observer that the object being viewed is located a greater distance away from the observer than it actually is, or in other words, is located at infinity. This impression created adds realism so that the observer views the object 19 as if he were located in an airplane approaching the carrier for a landing. The spacing of surfaces 22a and 23 must be constantly changed as the object 19 moves closer to the concave specular surface 22a in order to maintain focus of the image on the convex specular surface 23.

In FIG. 4, surface 22a has an upper edge 22a' and surface 22 has a lower edge 22'. Surface 23 has an upper edge 23' and a lower edge 23". The chordal distance between edges 23' and 23" is less than the distance measured between the remote outer edges 22a' and 22'.

The focusing arrangement shown in FIG. 4 is preferred although any other suitable arrangement may be employed as, for example, moving the two reflectors 20 and 21 as a whole, relative to each other, either by holding one fixed and moving the other or vice versa. The manner of automatically adjusting the focus will be explained hereinafter when describing the control system.

Since the optical arrangement above described forms images on the smaller reflector 21, this reflector may be used to introduce additional images if desired. As shown in FIG. 6, the reflector 21a may comprise a substantially uniformly thick spherical wall or body 30 made of a suitable transparent material such as a transparent plastic. On its convex surface, the reflector body 30 is partially coated with a suitable reflective material 31 such as sprayed metal sufficient to provide the convex specular surface but yet not enough to destroy transparency of the body. The opposite or concave side of the reflector body 30 may have arranged thereagainst suitably a picture or scape represented at 32. This picture forms a background for the images reflected from the convex specular surface provided by the coating 31. In the application of the invention herein described, the picture 32 may be a sea and sky scape which represents a suitable scene or background which the pilot sees behind the image of the carrier. By having the interior of the enclosure 10 behind the model 19 non-reflective as to light, including the supporting structure for the model 19, as by painting them a flat black, and by having the model 19 luminous, the observer will see only a combination of the sea and sky scape and carrier model.

As shown in FIG. 1, the model 19 is mounted in inverted position on the front end of a forwardly projecting, vertically extensible and contractible standard 33. This standard is supported on a carriage 34 adapted for translation in a transverse direction as permitted by the groove 35 in a dolly 36. This dolly 36 is arranged for translation in a longitudinal direction on rails 38. In this manner, the model 19 can be moved in three mutually perpendicular directions with respect to the pilot so as to produce the required relative movement between the imaged eye of the pilot at point 29 and the model 19. Also, the model 19 is suitably mounted to rotate about these same three mutually perpendicular directions to correspond to roll, pitch and heading attitudes of the aircraft, as hereinafter explained.

The pilot operates aircraft controls (not shown) which produce motion of the model carrier 19 and picture 32 and further maintain the optical system in focus, all to the end that the aircraft appears to the pilot to be responding to his control inputs. The device is entirely non-programmed and hence the response is due solely to the pilot's action. The control inputs are fed into a computer which calculates the correct motion of the ship model 19, the sea and sky scape 32 and the focusing reflector 22a, to respond to the pilot's control motions. Servomechanisms then translate these computations into actual motion of the various elements mentioned.

The pilot continues to fly down to the ship and actually passes over the ramp and onto the carrier deck. This is possible since the optical system images the pilot in space and the model can be moved in until the pilot's eye image is actually on the deck.

After the completion of a run, the pilot or an instructor may examine records of the flight path and sink speed during the run. Using these data, corrective action may be taken to modify the pilot's technique.

Considering now the computer and control aspects of the simulator, this involves a scaled down physical reproduction of the flight of an aircraft during the approach and landing phase. The equipment to achieve this may be functionally separated into three categories:

(1) The response of the aircraft, about its own axes, to control inputs from the pilot.
(2) Determination of the resulting flight path of the aircraft with respect to the carrier.
(3) The mechanization of this flight path.

Mechanization is accomplished by motion of the presentation rather than the aircraft, which does not fundamentally affect the computing problem, and involves the positioning of two elements, the horizon-seascape unit 32, and the carrier model 19. These movements are prescribed as an integral part of the basic computation, thereby minimizing the amount of equipment in the system. The focusing reflector 22a is preferably moved as a function of the range or longitudinal distance to the model carrier 19 always to keep the carrier image which is presented to the pilot at the proper distance.

FIG. 7 represents a general block diagram of the simulator controls. The inputs to the system are generated by the pilot through his operation of the cockpit controls such as stick, rudder and throttle. This basic information is fed into a conventional six degree of freedom analogue computer which can be adjusted for the aerodynamic parameters of the particular aircraft being simulated. The output of the computer presents the resulting response of the plane to these control actions. These outputs will be in the form of the rotational rates of the aircraft about its three major axes, i.e. roll rate, pitch rate and yaw rate, together with velocity, angle of attack, and sideslip.

The roll and pitch information may be used directly to control integrating servos driving the horizon-seascape surface. The result of this action will be for the horizon to move about in the pilot's field of view in exactly the same manner that it would in actual flight. A secondary advantage derives from this approach since the horizon-seascape mechanism is exactly producing the aircraft's pitch and roll attitude at all times. The location of suitable pickoff devices on this unit then allows direct measurement of the aircraft attitude with respect to the earth's surface. This information may then be supplemented with ground heading, angle of attack and sideslip to define the magnitude and direction of the plane's velocity vector in earth's coordinates, $V_x$, $V_y$ and $V_z$. It is then only necessary to add the carrier speed and heading condition in order to be able to drive the carrier model in its three translational modes, X, Y and Z.

The general computation above-described will reproduce the flight path performance. Two additional factors must be handled, however, in order to maintain the correct visual presentation. These factors involve the visual presentation of aircraft attitude changes and may be illustrated in the following simplified examples.

The maneuvering is actually accomplished by leaving the pilot motionless, and rotating the visual presentation. This means then, that to produce a roll response, not only must the horizon-seascape presentation rotate, but in addition, the ship model must roll correspondingly so that the deck plane remains parallel to the horizon. As a consequence, the model attitudes must be adjusted to correspond to the aircraft's roll, pitch and heading attitudes.

The second factor is demonstrated by considering a pitching condition. When the plane pitches nose down, for example, the carrier appears at a higher point in the pilot's vertical field of view. To accomplish this in the simulator, it is necessary to translate the model vertically in accordance with the pitch angle and range information. An analogous situation exists for the other rotational motions. The complete simulator control system, therefore, includes these additional elements of attitude control of the model and input signals to the translational channels due to aircraft attitude changes.

It is apparent that certain dynamic characteristics must be provided in order to produce accurate flight simulation. The most fundamental of these is the accurate reproduction of the aircraft's aerodynamic performance, including particularly its power characteristics and other non-linearities. The simulator preferably has the capability of simply and rapidly selecting the qualities of any of a number of the currently operational aircraft. This will insure the ability to encompass all of the aircraft types which may be operated from any given carrier at one time.

Provisions may be included to introduce turbulence effects, including those characteristically encountered in the last thousand feet of approach of carrier operations.

Since the model is being controlled in all six degrees of freedom, it is relatively simple to produce ship motion when it is desired. The computer and control system can be housed within the base 11.

In connection with night landing simulation, small lights in appropriate scale as to size and intensity may be arranged on the deck of the model carrier 19. Also, the effects of moonlight, sky shine, or stars can be achieved by use of a suitable element which has on it the desired effect, as the picture 32.

It will be seen that the optical arrangement hereinabove described has effectively three optical elements which are: a first concave specular surface which receives incident light from an object to be viewed; a convex specular surface which is so spaced from the first concave surface that light reflected from the first concave surface is focused on said convex surface; and a second concave specular surface which is impinged by light from the focused image reflected from the convex surface, this second concave surface being spaced from the convex surface a distance substantially equal to the prime focal length of the second concave surface thereby to reflect as parallel light rays the diverging light rays received and thus create a virtual image of the object at infinity. The two concave surfaces may be different surface portions of the second reflector as in FIG. 3, or they may be physically discrete elements as in FIG. 4. It is essential that the spacing between the second concave surface and the convex surface have the prime focal length distance in order to create the virtual image at infinity effect. The first concave surface may or may not have the same spacing, depending upon whether the incident light rays are considered parallel as in FIG. 3 or diverging as in FIG. 4.

From the foregoing, it will be seen that the stated objects of the invention are achieved. Changes and modifications within the teaching of the present disclosure will occur to those skilled in the art. It is to be understood clearly that the carrier landing simulator described herein is only one example of practical application of the invention and, therefore, is illustrative rather than limitative of the present invention, the scope of which is to be measured by the appended claims.

What is claimed is:

1. In a viewing device, an optical arrangement comprising means providing a first concave specular surface of revolution, means providing a second concave specular surface of revolution, and means providing a convex specular surface of revolution spaced from and facing both said concave surfaces and away from said first concave surface a distance substantially equal to the prime focal length of said first concave surface, said convex surface having circumferentially spaced outer edges on opposite lateral sides of said convex surface, said concave surfaces having remote lateral outer side edges, the chordal distance between said outer edges of said convex surface being less than the distance between said outer side edges of said concave surfaces, said second concave surface being spaced from said convex surface such that light from an object to be viewed passing laterally of one of said outer edges of said convex surface and being incident to said second concave surface is focused on said convex surface from whence it is reflected to impinge said first concave surface and thereby create a virtual image of said object at infinity viewable laterally of the other of said outer edges of said convex surface.

2. The optical arrangement as set forth in claim 1 wherein each of said specular surfaces is substantially spherical.

3. In a viewing device, the combination comprising an optical arrangement including means providing a first concave specular surface of revolution, means providing a second concave specular surface of revolution and a transparent reflector having a convex specular surface of revolution on one side and a substantially parallel surface on the opposite side, said convex surface facing both said concave surfaces and being spaced away from said first concave surface a distance substantially equal to the prime focal length of said first concave surface, said convex surface having circumferentially spaced outer edges on opposite lateral sides of said convex surface, said concave surfaces having remote lateral outer side edges, the chordal distance between said outer edges of said convex surface being less than the distance between said outer side edges of said concave surfaces, and a picture arranged on said parallel surface of said reflector, said second concave surface being spaced from said convex surface such that light from an object to be viewed passing laterally of one of said outer edges of said convex surface and being incident to said second concave surface is focused on said convex surface and thereby create a virtual image of said object at infinity superimposed upon a virtual image of said picture at infinity as a background and both viewable laterally of the other of said outer edges of said convex surface.

4. The combination as set forth in claim 3 wherein each of said specular surfaces is substantially spherical.

5. In a viewing device, an optical arrangement comprising means providing a first concave specular surface of revolution, means providing a second concave specular surface of revolution, and means providing a convex specular surface of revolution facing both said concave surfaces, all of said surfaces being generated by revolution about a common vertical axis through approximately 180° to provide a wide azimuth field, said convex surface being spaced away from said first concave specular surface a distance substantially equal to the prime focal length of said first concave surface, said convex surface having circumferentially spaced upper and lower edges, said concave surfaces having remote upper and lower edges, the vertical distance between said edges of said convex surface being less than the vertical distance between said edges of said concave surfaces, said second concave surface being spaced from said convex surface such that light from an object to be viewed passing laterally of one of said edges of said convex surface and being incident to said second concave surface is focused on said convex surface from whence it is reflected to impinge said first concave surface and thereby create a virtual image of said object at infinity viewable from a viewing station located laterally of the other of said edges of said convex surface, said viewing station being so distanced from said first concave surface as to permit a field of view which subtends an angle of about 30° measured in a vertical plane.

6. In a viewing device, the combination comprising an optical arrangement including means providing a first concave specular surface of revolution, means providing a second concave specular surface of revolution and means providing a convex specular surface of revolution spaced from and facing both said concave surfaces and away from said first concave surface a distance substantially equal to the prime focal length of said first concave surface, said convex surface having circumferentially spaced outer edges on opposite lateral sides of said convex surface, said concave surfaces having remote lateral outer side edges, the chordal distance between said outer edges of said convex surface being less than the distance between said outer side edges of said concave surfaces, the entrance pupil and exit pupil for said optical arrangement being on opposite lateral sides of said convex surface, and an object to be viewed arranged a distance not greater than ten focal lengths from said second concave surface and movable relative to said entrance pupil, said second concave surface being spaced from said convex surface such that light from said object passing through said entrance pupil and being incident to said second concave surface is focused on said convex surface from whence it is reflected to impinge said first concave surface and thereby create a virtual image of said object at infinity viewable through said exit pupil.

7. In a viewing device, the combination comprising an enclosure having non-reflective interior wall surfaces, an optical arrangement in said enclosure including means providing a first concave specular surface of revolution, means providing a second concave specular surface of revolution and means providing a convex specular surface of revolution spaced from and facing both said concave surfaces and away from said first concave surface a distance substantially equal to the prime focal length of said first concave surface, said convex surface having circumferentially spaced outer edges on opposite lateral sides of said convex surface, said concave surfaces having remote lateral outer side edges, the chordal distance between said outer edges of said convex surface being less than the distance between said outer side edges of said concave surfaces, the entrance pupil and exit pupil for said optical arrangement being on opposite lateral sides of said convex surface, and a luminous object to be viewed arranged in said enclosure and movable relative to said entrance pupil, said second concave surface being spaced from said convex surface such that light from said object passing through said entrance pupil and being incident to said second concave surface is focused on said convex surface from whence it is reflected to impinge said first concave surface and thereby create a virtual image of said object at infinity viewable through said exit pupil.

8. In a viewing device, an optical arrangement comprising a first reflector having a concave specular surface of revolution including first and second portions, and a second reflector having a convex specular surface of revolution, said surfaces opposing each other and spaced apart a distance substantially equal to the prime focal length of said concave surface, said convex surface having a shorter chordal length in one direction than the chordal length in the same direction of said concave surface, whereby light from an object to be viewed passing laterally of one side of said second reflector and being incident to said second concave surface portion is focused on said convex surface from whence it is reflected to impinge said first concave surface portion and thereby create a virtual image of said object at infinity viewable laterally of the other side of said second reflector.

9. In a viewing device, an optical arrangement comprising a first reflector having a first concave specular surface of revolution, a second reflector having a second concave specular surface of revolution, and a third reflector having a convex specular surface of revolution spaced from and facing both said concave surfaces and away from said first concave surface a distance substantially equal to the prime focal length of said first concave surface, said convex surface having circumferentially spaced outer edges on opposite lateral sides of said third reflector, said concave surfaces having remote lateral outer side edges, the chordal distance between said outer edges of said third reflector being less than the distance between said outer side edges of said concave surfaces, said second concave surface being spaced from said convex surface such that light from an object to be viewed passing laterally of one of said outer edges of said third reflector and being incident to said second concave surface is focused on said convex surface from whence it is reflected to impinge said first concave surface and thereby create a virtual image of said object at infinity viewable laterally of the other of said outer edges of said third reflector.

References Cited by the Examiner
UNITED STATES PATENTS

| | | | |
|---|---|---|---|
| 1,365,247 | 1/21 | Kennedy | 88—86 |
| 1,419,901 | 6/22 | Lehnoff-Wyld. | |
| 1,699,689 | 1/29 | Curry. | |
| 1,706,218 | 3/29 | Chretien. | |
| 2,485,345 | 10/49 | Ackerman | 88—57 |
| 2,534,543 | 12/50 | Bulloch. | |
| 2,576,147 | 11/51 | Sauvage. | |
| 2,786,387 | 3/57 | Belok | 88—57 |
| 2,867,151 | 1/59 | Mandler. | |
| 2,869,423 | 1/59 | Hoge et al. | 88—57 |
| 2,903,592 | 9/59 | Bolay. | |

JEWELL H. PEDERSEN, *Primary Examiner.*

EMIL G. ANDERSON, WILLIAM MISIEK, *Examiners.*